United States Patent Office 3,353,402
Patented Nov. 21, 1967

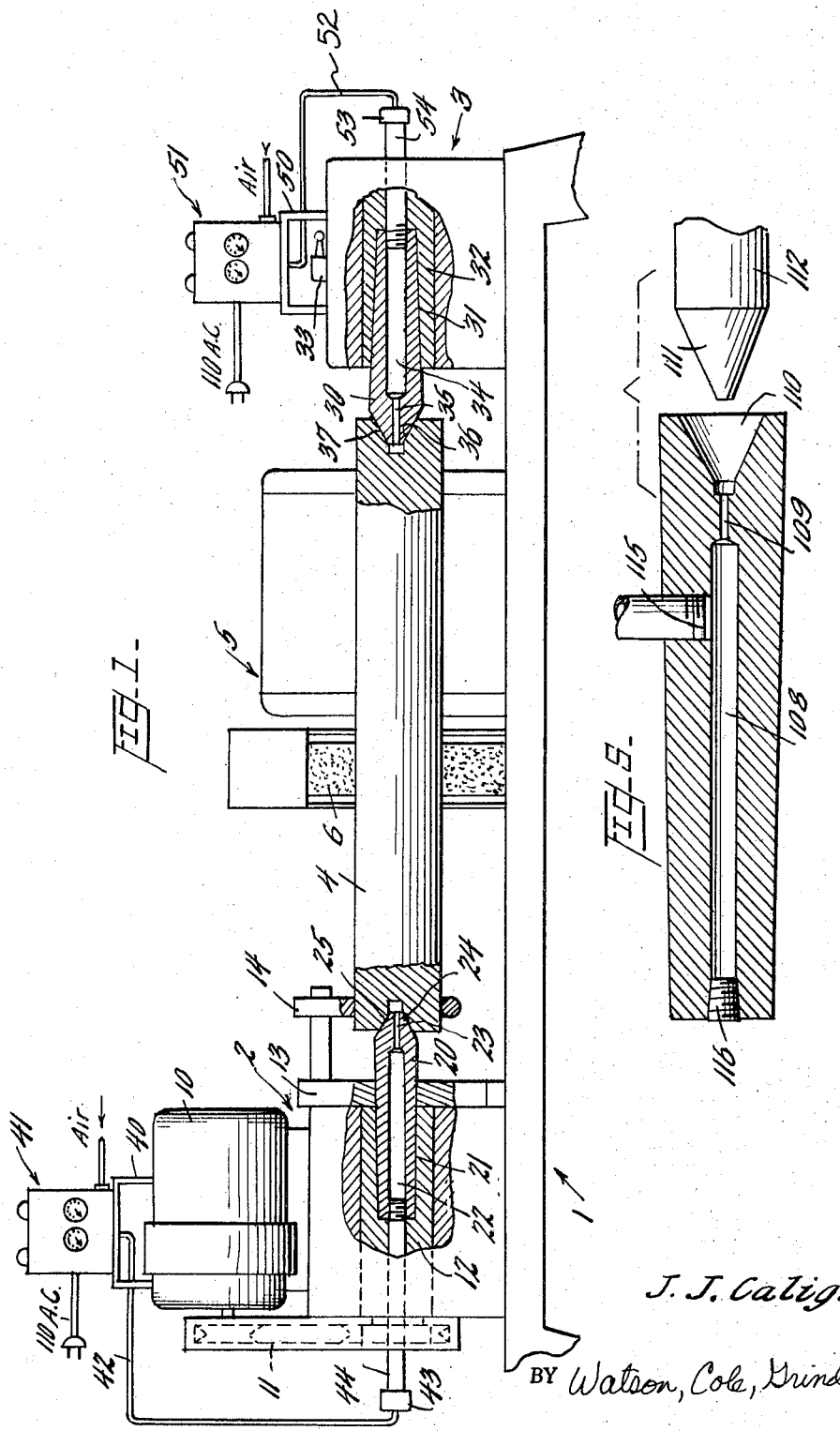

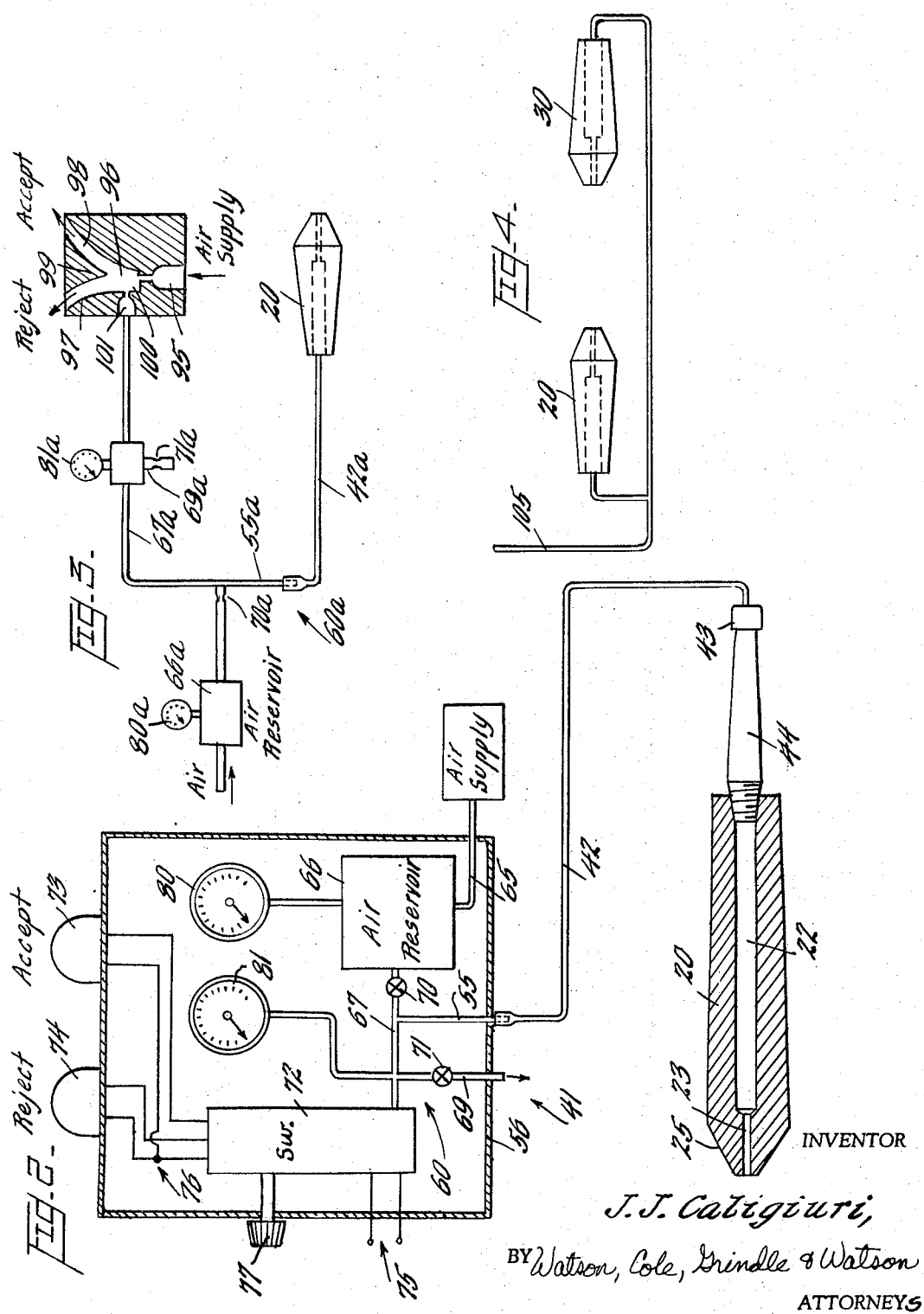

3,353,402
FLUID CENTERING AND SENSING
DEVICES
John J. Caligiuri, Buffalo, N.Y., assignor to
Joseph V. Tripoli
Filed May 24, 1965, Ser. No. 458,346
14 Claims. (Cl. 73—37.5)

ABSTRACT OF THE DISCLOSURE

A fluid system utilizing tapered sensor members for cooperation with corresponding center means on workpieces such as to be mounted on a machine tool for checking the alignment and integrity of said center means with positioning means being provided for placing said sensor member and said center means in face-to-face contact to normally for a seal. The center means may be formed at both ends of the workpiece with the fluid system forming an integral part of a conventional machine tool, such as a grinder or a lathe. In addition, bleed means is provided in the system to allow constant inflow and outflow of fluid to enhance the fluid signal and provision is made for obtaining direct readings indicating the nature of the fit between said member and said center means. Also, the system may include pure fluid detecting apparatus and may be provided with suitable valves for adjustment.

---

The present invention relates to fluid systems and, more particularly, to a fluid system for checking the alignment and integrity of a tapered center formed at the end of an elongated workpiece.

For the successful operation of machine tools or the like and particularly with lathe and grinding machines, the requirement arises for being able to check the center means that is normally machined on the end of the workpiece for supporting the same in the machine. This is true since if the centers of the workpiece are not true or the centers do not have a precisely formed configuration so that they are supported by point or step bearing interaction for example, then the workpiece will be improperly machined due to the off-center condition and, in extreme cases, this might cause costly damage to the machine or even injury to the operator as a result of breakage of the tools and machinery. To avoid such a happening, it is presently required in most machine operations that there be an inspection for this out-of-round or off-center condition by a visual inspection by the operator just before the machine is set for cycling. However, this inspection by the operator is very costly in that it takes a considerable amount of the operator's time to properly inspect the workpiece and its mounting on the machine tool. Furthermore, this visual inspection is subject to human error so that unless extreme caution is taken all of the possible discrepancies in the center hole that would cause an out-of-round condition cannot be readily detected. Also, there is the problem of quality control if human inspection is used since a faulty workpiece might be allowed to be machined whereby, due to the slight discrepancy that is present, the final product must be rejected thereby adding to the over-all cost of the operation.

Accordingly, one object of the present invention is to overcome the difficulties and disadvantages associated with the human inspection of the center means of a workpiece to be machined in a machine tool or the like and to provide a device that will inspect the workpiece in an automatic fashion.

The invention consists essentially in that a sensor member is provided that engages the tapered center formation of the workpiece so as to indicate to the operator whether or not the alignment and integrity of the same is such as to allow the machine tool to accurately and safely perform its operation. More particularly, a symmetrical sensor member, which may serve the additional function of being the usual center support member of a lathe or grinding machine, is provided to matingly engage the tapered center means of the end of the workpiece prior to the performing of the machining operation on said workpiece. The sensor member is, according to the invention, mounted with this center line extending along an axis corresponding to the axis along which said workpiece is to be centered on the machine tool and a fluid circuit is provided having a passage that extends through the sensor member and terminates at the engaging surface of said sensor member. This circuit and thus the passage in the fluid circuit is supplied with a substantially constant inflow of fluid. The circuit of the preferred embodiment disclosed also has bleed means for allowing substantially constant outflow of fluid from the circuit. A pressure-responsive means provided in the circuit detects the total outflow of fluid, if any, from the system. Thus, according to the invention, the outflow through the terminal end of the passage in said sensor member causes a drop in pressure in said fluid circuit so that by reading this pressure the leakage of fluid from the terminal end, if any, is detected and thus the mating fit of the sensor member and said center means of the workpiece is determined to indicate the alignment and integrity of said center means.

For the purpose of determining a truly centered and burr-free configuration in the workpiece, the symmetrical sensor member of the invention must be mounted with its axis extending along an axis corresponding to the axis upon which the workpiece is to be positioned for machining. For describing the invention, the workpiece in the preferred embodiment shown is mounted on a conventional grinder where the work is performed with the workpiece positioned between the center support members at opposite ends of the work in the usual manner. In this case, the opposed and aligned center support members of the grinding machine are also the sensor members of the fluid control system described so that in effect these members perform the dual purpose of first checking the center holes for accuracy and then supporting the workpiece during the machining operation. While this set-up is perhaps preferred since the checking operation can take place just before the machining operation and so that the sensor members can check further as to whether the workpiece is properly clamped by the center-sensor members, it is to be understood that the present invention contemplates that this workpiece center checking operation can be performed on specially designed tool inspection and lay-out machines that perform no other function than checking the alignment and integrity of the center holes in accordance with the teachings of the present invention.

Also, for ease of discussion and understanding of the present invention, the fluid control system described herein will be described as a pneumatic system, that is, wherein the operative fluid of the apparatus is air. It is contemplated, however, that other fluids, including liquids such as machine oil can be used to perform the operation of the arrangement of the present invention and that in certain cases the use of other gases or liquids might even be preferred. Due to the ready availability of air as a working medium and the fact that in the case where a leak is obtained between the mating relationship of the sensor member and the center means of the workpiece, the working air can be expended into the atmosphere without causing contamination of the workpiece or its surroundings, the use of air is preferred at present.

In the preferred embodiments of the invention described below, the output signal received from the novel fluid circuit is used to operate a suitable switch, such as a pressure-actuated electrical relay or a pure fluid amplifier. In any case, the output signal of the arrangement of the present invention is conditioned to indicate to the operator or the machine control whether the workpiece should be accepted and the machining operation performed or if it should be rejected and another workpiece substituted therefor. Since a definite signal is given to the operator as to whether the workpiece should be accepted or rejected, there is no chance for human error and this necessary centering and checking operation can be performed with ease and speed that has not been possible heretofore.

According to one important aspect of the combination of the present invention is the adjustability of the fluid circuit whereby the sensitivity of the system can be adjusted to establish the workpiece tolerance that is desired in a given case. That is to say, the system is provided with an adjustable valve at the fluid supply means and also at the bleed means so that the pressure within the fluid circuit can be easily regulated. If a close tolerance is desired a relatively low pressure is maintained by either opening the bleed valve or closing the supply valve, or both, so that the change in pressure in the circuit due to even the smallest of leakages between the mating surfaces of the sensor and the workpiece is readily discernible. On the other hand, if only workpieces with relatively large discrepancies are to be detected then the pressure in the circuit is maintained at a high level so that very small leakages do not readily effect a sizable change in pressure and thus are not detected.

Further, along these same lines, the pressure-responsive switch connected to said circuit is desirably capable of adjustment so that a threshold pressure at which the workpiece must be rejected is provided which serves to actuate the indicator, such as a light or other alarm or serves to automatically prevent the operation of the machine through a conventional cut-out relay.

Thus, another object of the present invention is to provide a fluid system for checking and inspecting center formations on workpieces that allows an inspection to be performed with a minimum of expense and a maximum degree of accuracy and sensitivity.

It is another object of the present invention to provide a fluid control system to be mounted in the usual machine tool with ease that can detect the alignment and integrity of the tapered center of the workpiece and at the same time check the machine tool for proper clamping of the workpiece.

It is another object of the present invention to provide a fluid control system of the character described that will insure the safety of the operator, and prevent the damage to the machine due to machining an off-center workpiece since an "accept" condition will not be indicated unless the center holes have been properly formed and the workpiece is properly clamped in the machine.

A further object of the present invention is to provide a fluid system for not only checking the alignment of the center hole and the clamping of the workpiece but also for checking the integrity of the center hole of the workpiece for proper shape, completeness, and freedom from burrs and foreign matter that might be imbedded in said center hole.

Still a further object of the present invention is to provide a fluid system of the character described wherein the sensor member that checks the center hole for alignment and integrity is part of the machine tool in which the workpiece is mounted for machining.

It is still a further object of the present invention to provide a fluid system for checking the alignment and integrity of a tapered center in a workpiece that is simple in design and relatively inexpensive while at the same time having a degree of accuracy and sensitivity for checking workpieces that has not heretofore been attainable with prior art devices or procedures.

It is still a further object of the present invention to provide a fluid control system for a machine tool or the like that will not interfere with or hinder the application of suitable coolant water to the workpiece during the machining operation and, further, to provide such a control system that will not be disabled by such coolant water from the machine.

A still further object of the present invention is to provide a control system of the character described that has a sensitivity capable of sensing errors in the order of magnitude of 0.001 inch and, in some cases, as small as 0.0002 inch so that the alignment and integrity of the center of the workpiece checked is virtually assured.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modifications in various obvious respects, all without departing from the invention. Accordingly, the drawings and description are to be regarded as illustrative in nature, and not as restrictive.

Referring now to the drawings:

FIGURE 1 is a side elevational view of the device of the present invention as applied to a conventional grinding machine operating on a workpiece supported along its center line;

FIG. 2 is a schematic diagram of the fluid system of the present invention;

FIG. 3 is a diagrammatic illustration of another embodiment of the fluid system of the present invention;

FIG. 4 is a diagrammatic illustration of an alternative arrangement of the sensor members of the fluid system illustrated in FIGS. 2 and 3;

FIG. 5 is a cross-sectional view of a sensor member of a different configuration for use with workpieces having center projections rather than center holes.

Referring now to FIG. 1 of the drawings, it will be remembered that the fluid system of the present invention may be applied to a conventional machine tool that requires centering of the work between spaced and aligned centers in the usual manner. The typical set-up for practicing the present invention may include a grinding machine 1 having a head stock 2 and a tail stock 3 for mounting a workpiece 4 adjacent a suitable grinder, generally represented by the reference numeral 5 and having a conventional grinding wheel 6. As will be later realized by those skilled in the art, the fluid control system of the present invention can be equally mounted and utilized with ease in other machine tools such as lathes, drill presses or other production machines where centering is required or the control system of the present invention could be equally used apart from machine tools in independent set-ups such as workpiece inspection and lay-out stations.

Mounted on top of the head stock 2 is a main drive motor 10 which serves to drive the belt 11 to rotate the driving sleeve 12 journaled in the body of the head stock 2. The driving sleeve transfers its driving force to driver 13 which engages dog 14 to drive the workpiece 4 in the well-known manner.

Frictionally held in the standard tapered bore of the driving sleeve 12 and the driver 13 is a combination center-sensor member 20 constructed in accordance with the present invention. The sensor member 20 preferably has a long tapered shank 21 so as to be capable of easy insertion or withdrawal from the driving sleeve 12 in a conventional manner. A sensor passage 22 extends the length of the sensor member 20 for a purpose presently to be described and said passage 22 terminates in a controlled orifice 23 that communicates with a center hole presenting a tapered face 24 formed in the end of the workpiece 4. The center hole 24 matingly receives a tapered face 25 formed on the terminal end of the sensor member 20 to support the adjacent end of the workpiece 4. In the normal case, the mating faces 24, 25 are formed by the usual machining operations that provides an airtight seal when the workpiece 4 is properly in place ready for the grinding operation but said faces 24, 25 may in some cases be finished to have a polished surface, if desired.

Disposed adjacent the opposite end of the workpiece 4 is a similar center-sensor member 30 having a long tapered shank 31 that is frictionally held within a conventional adjusting sleeve 32 that can be operated toward and away from the workpiece 4 by manipulation of a handle 33 on the tail stock 3 so that said workpiece 4 can be positioned in the machine 1. The member 30 has a longitudinally extending sensor passage 34 that has a function identical to the passage 22 in the sensor member 20 and which will be discussed in detail later. The passage 34 also terminates in a controlled orifice 35 that opens into a center hole having a tapered face 36 that is engaged by tapered face 37 of the sensor member 30 so as to support this end of the workpiece 4. As before, these mating faces 36, 37 have been previously machined, or finished to any degree of polish desired, so that normally they are sufficient to form an air-tight seal at their junction for a purpose which will subsequently become evident. At the present time, suffice it to say that if both the seal at this end of the workpiece 4 formed by the mating faces 36, 37 and the seal at the other end of said workpiece 4 formed by the mating faces 24, 25 are air tight, then the center holes of the workpiece 4 are properly formed and aligned so that the fluid system, now to be described, indicates to the operator that the grinding operation can be safely initiated.

Still referring to FIG. 1, it can be seen that a platform 40 is fixed to the housing of the motor 10 to conveniently mount the first fluid control unit 41 which is connected to the sensor passage 22 of the member 20. This connection is preferably made by a flexible tube 42 having a cap 43 which, in turn, rotatably engages an extension pipe 44 which threadedly engages the member 20 for communication with the sensor passage 22 (see FIGS. 1 and 2). Similarly, a bracket 50 mounts a second fluid control unit 51 on the tail stock 3, and the control unit 51 is connected to the fluid passage 34 by means of a flexible tubing and cap 52, 53 and an extension tube 54 that threadedly engages the sensor member 30 at one end and is received by the cap 53 at the other end (see FIG. 1).

The fluid control system of the present invention is thus installed in the head stock 2 of the machine 1 as well as in the tail stock 3 for good results. However, it might be desirable in certain cases to install the device of the invention in only said head stock 2 of the machine or only in said tail stock 3, which arrangement would give acceptable results in that the over-all alignment of the workpiece 4 can be detected at either end of the workpiece. It should be realized that the fluid control unit 41 and the fluid control unit 51 are desirably identical in structure so that these units can be inexpensively manufactured and used interchangeably as desired. The one difference that is present between the sensor member 20 of the head stock 2 and the sensor member 30 of the tail stock 3 lies in the fact that, in the former, said sensor member 20 rotates with workpiece 4 while, in the latter, the sensor member 30 remains stationary during the rotation of the workpiece 4 as in the usual case of a machine tool of this type. This fact in no way affects the application of the device of the present invention to either the head stock 2 or the tail stock 3. In fact, either the sensor member 20 or the sensor member 30 can be live (rotating) or dead (non-rotating) during the grinding operation by the machine 1. This is so since the sensing operation is usually performed before the workpiece is rotated for machining and, therefore, the sensing member 20 and the sensor member 30 are normally stationary with respect to the workpiece 4 during the sensing operation. However, it is to be understood that either or both of the fluid control systems of the head stock 2 and the tail stock 3 can be successfully operated during the operation of the machine if desired so that any imbalance that might occur during the machining operation can be detected.

Referring now to FIG. 2 for a fuller understanding of the fluid control system of the present invention, there is illustrated the fluid control unit 41 which is applied to the head stock 2 of the grinding machine 1, illustrated in FIG. 1, which will now be discussed in detail; it being understood that the fluid control unit 51 that is applied to the tail stock 3 of the grinding machine 1 is identical in structure and, thus, will not need to be discussed in detail.

It will be remembered that the sensor member 20 has its passage 22 connected to the extension tube 44 which, in turn, is connected to the flexible tubing 42 by the cap 43. The opposite end of the tubing 42 is connected to a signal passage 55 that extends out from a protective housing 56 so that said opposite end of the tubing 42 can be conveniently slipped over it in the manner illustrated in this figure. The signal passage 55 forms an integral part of a fluid circuit 60 which is housed in the protective casing 56 and forms the heart of the fluid control system of the present invention and now to be described.

The fluid circuit 60 receives a constant air supply through an input passage 65, it being understood that the air supply can be any suitable source such as a central air system of the machine shop in which the device of the invention is to be utilized or, in the alternative, a separate air compressor can be used if a central supply is not available. The input passage 65 opens into a chamber or reservoir 66 that acts on the incoming air so as to tend to remove any fluctuations in pressure or perturbations that might occur in a normal air supply.

For the purpose of interconnecting the reservoir 66 and the fluid circuit 60 there is provided a main passage 67 that further communicates with the signal passage 55 and a bleed passage 69. Interposed in the main passage 67 is a needle valve 70 or other suitable adjustable restriction so that the pressure in the downstream part of the fluid circuit 60 can be regulated for a purpose to be described subsequently. Another needle valve 71 or suitable adjustable restriction is interposed in the bleed passage 69 for a purpose also to be described subsequently. The main passage 67 is connected to a conventional fluid-responsive switch 72 that serves to actuate an "accept" indicator and a "reject" indicator 73, 74, respectively, in response to the fluid pressure in the main passage 67. This switch 72 may be of the electrical type whereby an electrical connection 75 is required whereby the indicators 73, 74 may be electric lights that receive actuating current from the switch 72 through suitable wiring, generally represented by the reference numerals 76 in this figure. The threshold pressure between a first range of pressures and a second range of pressures at which the switch 72 acts to shift from the "reject" condition to the "accept" condition or vice-versa can be regulated and adjusted by a knob 77 and suitably calibrated scale (not shown). It should be understood that this adjustable pressure-responsive switch 72 is conventional hardware and well known to those skilled in this art and thus does not need to be discussed further herein. The switch 72 need not be connected to indicator lights 73, 74 but may be connected to actuate any other sort of alarm to alert the operator as to the status of the workpiece or, in the alternative, the switch 72 can operate directly to the machine control to disable the machine when a "reject" condition is present and to allow normal cycling when an "accept" condition is found.

The input pressure to the fluid circuit 60 can be read on a suitable fluid pressure gauge 80 that is tapped into the reservoir 66 in the manner indicated. The main valve 70 in conjunction with the bleed valve 71 functions to reduce the input pressure from the air supply to a desired working pressure which is usually lower than the central air supply of a shop. Thus, the valves 70 and 71 can be set to maintain the pressure in the main passage 67 at a desired pressure which is conveniently indicated on a pressure gauge 81 that communicates with said main passage 67. It has been found that a pressure of about 30 pounds per square inch in the fluid circuit 60 is a particularly suitable working pressure, that is, back pressure, which gives good results although it is to be understood that this specific pressure is merely exemplary and that other working pressures as may be desired by the operator can easily be obtained by a simple adjustment of the valves 70 and 71, as indicated. More specifically, by appropriate adjustment to the valves 70 and 71, the pressure in the fluid circuit can be kept at a constant value provided that fluid does not escape the circuit 60 at other points. Thus, in the normal case, the main valve 70 is adjusted to provide a constant inflow of fluid to the system and the bleed valve 71 is adjusted to provide a constant outflow of fluid from the system whereby the working pressure read on the pressure gauge 81 will remain at the constant value selected, which, in the exemplary case indicated, would be 30 pounds per square inch.

In operation, after the input passage 65 has been connected to the air supply and the electrical lines 75 of the switch 72 have been connected to a suitable source of electricity, the main valve 70 and the bleed valve 71 can be slowly opened to cause the pressurized fluid from reservoir 66 to ester the fluid circuit 60 and to maintain a pressure in such circuit. When this is done, fluid enters the signal passage 55 and travels through the tubing 42, thence to the extension tube 44 and finally to the passage 22 and out the restricted orifice 23 to the atmosphere, provided that there is nothing blocking said orifice 23.

The size of the restricted orifice 23 is selected to permit only a predetermined amount of air to exhaust therethrough when there is no obstruction to flow along this path so as not to completely deplete the supply of air held in the fluid circuit 60 at any one time and thus to retain said circuit 60 at a terminal pressure in readiness for operation. Also, the valve 71 has been positioned so as to also exhaust a predetermined amount of air to the atmosphere from the fluid circuit 60. Under these conditions of exhausting the fluid circuit 60 through two paths, that is, through the lead passage 69 and the signal passage 55, the pressure in the main passage 67 will be reduced but not depleted and the switch 72 will be conditioned to activate the "reject" indicator 74 in response to the lower pressure in the fluid circuit 60. If, however, the orifice 23 is blocked, as by the finger of the operator for testing the fluid system or by the workpiece during the checking operation of the alignment and integrity of the center means of the workpiece 4, as shown in FIG. 1, then the back pressure in the circuit 60 will rise above the terminal pressure since the only air that is exhausting from the system is through the bleed passage 69 and since the same amount of air is entering the circuit 60 through the main valve 70. This rise in the pressure in the main passage 67 causes the pressure-responsive switch 72 to de-activate the "reject" indicator 74 and simultaneously activate the "accept" indicator 73 as the threshold pressure is reached, which denotes that there is no leakage of air past the seal formed by the mating faces 24, 25 of the workpiece 4 and the sensor member 20, respectively. As is evident, any leakage larger than the size of said orifice 23 does not indicate a drop in pressure past said terminal pressure so that the selected size of said orifice 23 determines the effective range of the system of the invention.

To explain the operation further, as long as the center holes 24, 36 of the workpiece 4 are properly formed and said workpiece 4 is properly aligned and clamped between the sensor members 20, 30, then there will not be any leakage of air past the mating faces 24, 25 and 36, 37 of the members 20, 30 and the workpiece 4 so that the pressure in the circuit remains at a high level and the "accept" indicator is actuated. However, if a discrepancy in the alignment or integrity of the center holes 24, 36 is present, the system of the present invention will immediately indicate this condition to the operator by actuation of the "reject" indicator 74, whereupon the operator may take the necessary steps to correct the situation so that the machine tool can be properly and safely operated.

Thus, it can be seen that a simple and reliable system has been provided by the present invention whereby the condition of the centers of a workpiece 4 can be readily determined by the operator of the machine. In addition, the system of the present invention is capable of detecting such conditions that might cause an off-center workpiece 4 with accuracy that has heretofore not been possible with prior devices of which I am aware. For example, when the circuit pressure of the system is set for 30 pounds per square inch as in the example given, a leak of 0.001 inch between the mating faces 24, 25 of the sensor member 20 results in a drop of approximately 5 pounds per square inch, which drop in pressure can be easily and readily detected visually on the pressure gauge 81 or automatically by the conventional pressure-responsive switch 72 to indicate the proper action that can be taken.

In addition, the system of the present invention can be advantageously adjusted to suit the conditions desired by the operator in that the valves 70, 71 and the size of the orifice 23 can be adjusted and selected to give more or less sensitivity to the system thereby establishing the workpiece tolerance and the level of acceptability of the workpiece 4. More particulary on this point, if the operator of the machine 1 desires more accurate workpieces with minute or no misalignment of the center holes and with no rough places or burrs on the faces 24, 36, then the opening at the valve 71 is increased or the opening at the valve 70 is decreased, or both, so that the pressure in the fluid circuit 60 is decreased whereby any leakage past the seal at the mating faces 24, 25 causes a greater proportional drop in the pressure of the circuit which pressure drop because of its magnitude is more easily detected than before. Conversely, if less sensitivity of the system is desired so that only extremely bad workpieces for example are rejected, then the opening at the valve 70 is increased and/or the opening at the valve 71 is decreased as desired for a higher pressure in the circuit 60 and correspondingly less pressure drop when a flaw of a certain size is present. The size of the orifice 23 is usually retained at a constant dimension which, as stated, is selected to prevent total depletion of the pressure in the circuit 60 when the workpiece 4 is removed so that a long waiting period is not required for the pressure to build up in the system between checking operations.

Further, the fluid-responsive switch 72 of the present invention is easily adjustable to suit the machine operator's requirements for actuating the indicators 73, 74 to a very fine degree. This adjustment is accomplished through the adjustment of the knob 77 that adjusts the response level of the switch 72 to regulate the threshold pressure level. For example, in the hypothetical case presented if the pressure in the fluid circuit 60 is selected as 30 pounds per square inch through positioning of the valves 70, 71 then the knob 77 can be positioned so that the "reject" indicator 74 is only actuated after a predetermined size of leakage occurs past the seal at the orifice 23. In actual tests it has been found that a 0.001 inch leakage causes a 5-pounds-per-square-inch drop in pressure in the hypothetical case mentioned, so that if the switch 72 is set to indicate a "reject" condition at 25 pounds per square inch, then all pieces having a 0.001 inch flaw or bigger are rejected. Anything less than a 0.001 inch flaw is indicated as a pressure drop on the pressure gauge 81 but here the operator at his discretion can allow the work cycle to continue since the prerequisite size of leakage due to misalignment or lack of integrity of the center is not present.

Referring now to FIG. 3, a simplified and alternative arrangement of the fluid system of the present invention is shown wherein like reference numerals with the suffix $a$ for additional identification refer to like elements of the embodiment of FIG. 2. In this embodiment, the valves 70a, 71a take the form of fixed restrictions in a pure fluid circuit 60a that is designed to operate in a particular environment wherein adjustment of the sensitivity of said circuit 60a is not required.

The fluid-responsive switch 72α in this simplified circuit has been shown as a pure fluid digital amplifier commonly known in the fluid art as a "flip-flop" that can be utilized to provide the output signal of the system in lieu of the electrical pressure-responsive switch 72.

To explain the operation of the pure fluid amplifier 72a, assume that a constant air supply is being provided to a power nozzle 95 that emits a power stream of fluid into an interaction region 96 where the power stream of fluid is directed to one or the other of the output passages 97, 98. An asymmetrical island divider 99 is provided between the output passages 97, 98 so that the power stream of fluid is initially directed toward the output passage 97. The adjacent side wall 100 of the interaction region 96 is stepped back to form a cut-out in the manner indicated so that the boundary layer effects created to the left of the power stream forms a low-pressure region next to the wall 100 so as to cause the power stream to lock onto this left-hand wall 100 whereupon a "reject" signal is supplied. Contrariwise, the opposite or right-hand wall may be vented to the atmosphere to prevent lock-on when the power stream is directed to the passage 98. A control nozzle 101 is provided to communicate with the boundary layer region at the wall 100 for the purpose of emitting a pressurized control stream into said boundary layer region to fill this low-pressure region with fluid and thus to shift the power stream from the output passage 97 to the output passage 98 upon the occurrence of the threshold pressure due to the increased back pressure in the signal passage 55a and the main passage 67a of the fluid circuit 60a that indicates a leak-free fit with the workpiece and thus an acceptable condition for operation of the machine 1. The threshold pressure of this switch 72a is built into the configuration of the interaction region 96 so that the sensitivity to the leakage past the seal at the mating faces 24, 25 can be selected by simply using the proper pure fluid amplifier 72a. The output passages 97, 98 can be connected to conventional pneumatic read-out devices for indication to the operator of the condition regarding the alignment of the workpiece 4, such as conventional pivotal tab indicators (not shown) mounted across the openings of said passages 97, 98 that will be raised by an appropriate output signal from said passages 97, 98. This pure fluid arrangement is particularly desirable where it is dangerous or inconvenient to use electrical components in the test set-up and where further reduction in cost is desired.

In FIG. 4, there is illustrated a possible modification of the fluid control system of the present invention wherein both sensor members 20, 30 are connected through the same flexible tubing 105 for connection to the signal passage 55. This results in a leakage test being performed between the faces 24, 25 and 36, 37 at both center holes simultaneously through one fluid control system 41 so that an output signal as a result of the mating fit at either of said holes is supplied to the indicator 73, 74, as before. This arrangement has the advantage of insuring that both of the center holes are free from fault and thus one sensor member 20, 30 acts as a check on the other.

A modification of the sensor members 20, 30 is shown in FIG. 5 and comprises a passage 108 which terminates in a restricted orifice 109 as before but the end of the sensor member forms a hole having a tapered face 110 which is adapted to receive a projection having a mating face 111 on a workpiece 112. This arrangement has been found to work equally as well as the foregoing embodiments since the tapered face 111 forms a seal with the tapered face 110 in the absence of mis-alignment or similar discrepancy which would cause the workpiece 112 to be off center.

Also illustrated in FIGURE 5 is a modification of the manner in which the fluid control units 41, 51 may be attached to the fluid passage 108 for use in the non-rotating tail stock 3. This modification consists of supplying an additional threaded aperture 115 that communicates with the passage 108 so that the extension tube such as the tube 44 is unneccessary. In this case the flexible tubing 52 is connected directly to the tapped aperture 115 and the end of the passage 108 is sealed with a suitable plug 116 to form an air-tight seal.

In this disclosure, there is shown and described only the preferred embodiment of the invention, but, as aforementioned, it is to be understood that the invention is capable of various changes or modifications within the scope of the inventive concept as expressed by the accompanying claims.

What is claimed is:

1. A fluid system for checking the alignment and integrity of center means presenting a tapered face on the end of a workpiece to be mounted on a machine tool or the like where centering is required, comprising a sensor member having an end face including at least a tapered portion for engaging the corresponding tapered face on said center means, means for positioning said tapered portion against said tapered face of said center means of said workpiece in face-to-face contact to normally form a seal, said sensor member being mounted with its center line extending along an axis corresponding to the axis along which said workpiece is to be centered, a passage in said system extending through said sensor member and opening at the surface of said end face of said member for communication with said center means, fluid supply means for normally maintaining fluid in said system at substantially constant pressure, and pressure-responsive means to detect the pressure in said passage for determining the leakage of fluid, if any, past said seal formed by said faces whereby the mating fit of said sensor member with said center means is determined to indicate the alignment and integrity of said center means.

2. The combination of claim 1 wherein said faces are continuous and normally form a fluidtight seal around the full periphery of said member and there is further provided separate bleed means for substantially constant outflow of fluid from said system and wherein said supply means provides a substantially constant inflow of fluid equal to said outflow from said bleed means.

3. The combination of claim 2 wherein said supply means includes an adjustable valve to regulate the amount of said constant inflow to said system and said bleed means includes a further adjustable valve to regulate the amount of said constant outflow from said system whereby the pressure in said system and thus the sensitivity of said system can be regulated.

4. The combination of claim 3 wherein said pressure-responsive means includes a first fluid pressure responsive indicator to be actuated in response to a first range of pressures in said passage to indicate a faulty fit of said member with said center means and a second fluid pressure responsive indicator to be actuated in response to a second range of pressures in said passage to indicate a good fit.

5. The combination of claim 1 wherein said tapered face is conically shaped and the terminal end of said passage is located along said axis of the sensor member whereby said fluid is capable of acting along all sides of said tapered face to detect leakage.

6. The combination of claim 1 wherein said center means is an enclosure and said sensor means is a projection for insertion into said enclosure.

7. A fluid control system for checking the alignment and integrity of plural center means presenting opposed tapered faces, one tapered face on each end of a workpiece to be mounted on a machine tool or the like where centering is required, comprising a first sensor member having an end face including at least a tapered portion for engagement with the corresponding tapered face on one of said center means, a second sensor member opposed to and aligned with said first sensor member, said second sensor member having an end face including at least a tapered portion for engagement with the corresponding face on the other of said center means, means for positioning said tapered portions against said tapered faces of said center means of said workpiece in face-to-face contact to normally form a seal, said first and second sensor members being mounted with their center lines extending along an axis corresponding to the axis along which said workpiece is to be centered, a passage in said system extending through said one sensor member and opening at the surface of said end face of said one member for communication with said one of said center means, fluid supply means for normally maintaining fluid in said system at substantially constant pressure, and pressure-responsive means to detect the pressure in said passage for determining the leakage of fluid, if any, past said seal formed by said faces whereby the mating fit of said one sensor member with said one center means is determined to indicate the alignment and integrity of said center means.

8. The combination of claim 7 wherein is further provided a second passage in said system extending through said second sensor member and terminating at said end face of said second sensor member for communication with said other of said center means.

9. The combination of claim 7 wherein said faces are continuous and normally form a fluidtight seal around the full periphery of said member and there is further provided bleed means for substantially constant outflow of fluid from said system and wherein said supply means provides a substantially constant inflow of fluid to said system equal to said outflow from said bleed means.

10. The combination of claim 9 wherein said supply means includes an adjustable valve to regulate the amount of said constant inflow to said system and said bleed means includes a further adjustable valve to regulate the amount of said constant outflow from said system whereby the pressure in said system and thus the sensitivity of said system can be regulated.

11. The combination of claim 10 wherein said tapered portion of said first and second members are conically shaped and the terminal end of said first and second passages is located along the axis of the sensor member.

12. The combination of claim 11 wherein said pressure-responsive means includes a first fluid pressure responsive indicator to be actuated in response to a first range of pressures in said passage to indicate a faulty fit of said member with said center means and a second fluid pressure responsive indicator to be actuated in response to a second range of pressures in said passage to indicate a good fit.

13. The combination of claim 12 wherein said pressure-responsive means is adjustable whereby the threshold pressure between said first and second ranges of pressures can be regulated.

14. The combination of claim 8 wherein said fluid control system is mounted in said machine tool and said positioning means includes a head stock and tail stock for mounting said first and second sensor members, respectively.

References Cited

UNITED STATES PATENTS

| | | | |
|---|---|---|---|
| 2,584,714 | 2/1952 | Kirkpatrick | 33—147 |
| 2,779,188 | 1/1957 | Meyer | 73—37.8 |

LOUIS R. PRINCE, *Primary Examiner.*

W. A. HENRY, *Assistant Examiner.*